United States Patent [19]

Nack et al.

[11] 4,084,545
[45] Apr. 18, 1978

[54] OPERATING METHOD

[75] Inventors: Herman Nack, Upper Arlington; Ke-Tien Liu, Columbus, both of Ohio

[73] Assignee: Battelle Development Corporation, Columbus, Ohio

[21] Appl. No.: 803,831

[22] Filed: Jun. 6, 1977

Related U.S. Application Data

[63] Continuation of Ser. No. 624,542, Oct. 21, 1975.

[51] Int. Cl.² ............................ F22B 1/02; F23D 1/00
[52] U.S. Cl. .................................... 122/4 D; 110/342; 110/347; 110/245
[58] Field of Search .............. 122/4 D; 110/28 J, 8 F; 48/197 R, 206; 423/242

[56] References Cited

U.S. PATENT DOCUMENTS

| | | | |
|---|---|---|---|
| 2,638,684 | 5/1953 | Jukkola | 110/28 J |
| 2,654,665 | 10/1953 | Phinney | 48/206 |
| 2,665,200 | 1/1954 | Kwauk | 48/197 |
| 2,741,549 | 4/1956 | Russell | 110/28 J |
| 2,774,661 | 12/1956 | White | 75/9 |
| 3,066,017 | 11/1952 | Jahnig | 23/288 |
| 3,508,506 | 4/1970 | Bishop | 122/4 D |
| 3,645,237 | 2/1972 | Seth | 122/4 D |
| 3,763,830 | 10/1973 | Robinson et al. | 122/4 D |
| 3,784,676 | 1/1974 | Moss | 122/4 D |
| 3,807,090 | 4/1974 | Moss | 122/4 D |
| 3,823,676 | 7/1974 | Cook et al. | 110/28 J |
| 3,840,354 | 10/1974 | Donath | 48/206 |

*Primary Examiner*—Kenneth W. Sprague
*Attorney, Agent, or Firm*—Philip M. Dunson; C. Henry Peterson; Barry S. Bissell

[57] ABSTRACT

A method of operating a fluidized bed system, typically as a combustor system for power or steam generation by burning high-sulfur coal, which comprises forming an entrained fluidized bed in a first space region contaning a first solid bed particle component, such as a hematite ore containing over 90% $Fe_2O_3$, or limestone, forming in a more limited space region within the first region a dense fluidized bed containing a second solid bed particle component, such as larger particles of the hematite, essentially comprising a material having long-term physical and chemical stability in the fluidized bed system so as to be substantially non-agglomerating and not subject to substantial attrition therein, providing a recirculation path such as through a cyclone separator and particle reservoir for the first particle component from the first space region through the dense fluidized bed in the more limited space region, and operating the fluidized bed system at a velocity such that the second component particles are effectively retained in the dense fluidized bed in the more limited space region, whereas the first component particles recirculate and interpenetrate therethrough, commingling with the second component particles.

51 Claims, 4 Drawing Figures

OPERATING METHOD

This is a continuation of our copending application Ser. No. 624,542, filed Oct. 21, 1975 for Operating Method.

BACKGROUND AND SYNOPSIS

This invention relates to methods of operating a fluidized bed system combining a dense fluidized bed and an entrained fluidized bed. More particularly it relates to the operation of a system wherein the beds contain two different particle components, at least one component having long-term physical and chemical stability in the system and being retained in the dense fluidized bed while the other is entrained and recirculated therethrough.

Fluidized beds operated according to the methods disclosed herein can be utilized in a multitude of processes, from simple heat-exchange reactions through ordinary catalytic reactions to complex chemical reactions. However, our methods will be described and illustrated in connection with the operation of a fluidized-bed combustor for burning high-sulfur coal, to provide heat for a boiler while reducing noxious emissions to almost any reasonably desired extent.

Good general discussions of the characteristics of fluidized beds for deriving energy products such as heat and fuel gas from coal can be found in U.S. Pat. Nos. 2,638,684, 2,665,200, and 3,840,353 and references cited therein. One general type of coal gasification plant which has been proposed employs a so-called moving burden of essentially inert material to carry heat from a heating vessel or combustion vessel to a gasification vessel. According to U.S. Pat. No. 2,654,665, the inert material is ash, which is heated by burning carbon particles, that are mixed with the ash, in a combustion vessel or in its entrance conduit. The combustion vessel contains a fluidized bed operated at a temperature of 1950° F. It is known that coal ash agglomerates at this temperature to form increasingly larger particles, as explained in U.S. Pat. No. 3,840,353 supra. The large particles of ash remain in the fluidized bed in the combustion vessel until they are discharged through a draw-off conduit, whereas the finer ash particles are entrained and carried out of the combustion chamber. They are separated from the fluidizing gas, passed through the gasification vessel to supply heat for the endothermic reaction, and then returned to the combustion vessel to be reheated.

According to another proposal for a gasification plant of the same general type, disclosed in U.S. Pat. No. 2,741,549, a dense fluidized bed in the combustion vessel contains coarse sand. The velocity of the gas is chosen so that coarse solids remain in the bottom portion of the vessel, while fine solids are entrained in the bottom portion and move farther up to form a thin dense fluidized layer of fine solids on top of the bottom dense fluidized bed. The formation of this layer is effected by widening the vessel to reduce the gas velocity and/or by the use of a screen or tower packing. The fine solids in the layer are then drawn off through a conduit and fed into the gasification vessel to supply heat thereto.

According to still another proposal for a gasification plant of the same general type, disclosed in U.S. Pat. No. 2,979,390, only fully entrained fluidized beds are contained in both the heating vessel and the gasification vessel, and an additional supply of heat for the gasification vessel is brought in by a flow of a so-called thermophore. The thermophore comprises particles of a material which is readily separable from coal and ash, having a high fusion temperature, high specific heat and high specific gravity. The thermophore is heated in a separate vessel, to a temperature higher than the fusion temperature of ash, passed through the entrained fluidized bed in the gasification vessel, separated from the entrained coal and returned through its own separate heating vessel. This arrangement can be contrasted with that of U.S. Pat. No. 2,638,684 supra, wherein a dense fluidized bed of inert materials remains in the reactor, whereas the coal particles are entrained, without, however, being recirculated through the dense fluidized bed.

There have also been a number of recent proposals to provide commercial fluidized bed boiler systems. According to some of these proposals, ground coal is fed into a bed of limestone particles that are fluidized with the air which supports combustion. The limestone acts as a sorbent for the sulfur in the coal, since the sulfur combines with oxygen from the air to form sulfur dioxide, and the sulfur dioxide reacts with the limestone to form calcium sulfate. The calcium sulfate can be disposed of with the ash from the burned coal, or if desired the sulfur can be recovered and the limestone regenerated.

In comparison with conventional pulverized coal-fired boilers, fluidized bed systems offer the advantages of reduced boiler size, increased efficiency and flexibility and the ability to burn highly caking coal. Moreover, because they operate at a lower temperature, i.e., a temperature around 1550° F which optimizes the efficiency of the $CaSO_4$- forming reaction, there is reduced $NO_x$ emission as well as reduced $SO_2$ emission, and reduced steam tube corrosion and fouling.

Fluidized bed combustors operated in accordance with the methods of the present invention retain these advantages and additionally provide other advantages, including still further reductions in boiler size and heat transfer surface requirements. Because of these reductions, there can be a significant decrease in the capital cost of industrial boiler systems, savings in construction materials, labor, transportation costs, and avoidance of the necessity for field erections of many boilers, which can be very compact, shop-fabricated and railroad or truck-transportable.

The generation of a high output of heat in a compact unit necessitates a high throughput of coal, which in turn requires a high volume of air per unit time to burn the coal, that is, a high velocity of air passing through the fluidized bed. This air and the resulting combustion gases also serve the purpose of fluidizing the bed, and its velocity is commonly indicated by the term "superficial velocity." The superficial velocity is calculated by dividing the volume of gas per unit time, passing through the combustor, by the cross-sectional area of the combustor normal to the principal direction of the air flow. Hence the superficial velocity is the velocity the gas would have if the combustor were empty of the fluidized bed particles which it normally contains.

Previous fluidized-bed boiler combustors have generally been limited to operation at superficial velocities no greater than around 10–14 feet per second, and usually considerably less, because at high velocities substantial quantities of carbonaceous particles and limestone particles are elutriated or blown out of the combustor long before they can be completely burned or sulfated. On the other hand, a combustor has been very satisfactorily operated in accordance with this invention at a superficial velocity greater than 30 feet per second, and there is no apparent reason that this can not be increased to perhaps 100 feet per second or so, with suitable adjustment of other operating parameters.

In accordance with one typical procedure, instead of the conventional limestone bed in the combustor we emply two solid particle components, at least one of the components essentially comprising a material having long-term physical and chemical stability in the combustor system. One specific material we have successfully used to form one or both components is a hematite ore, containing about 93% of an oxide of iron, $Fe_2O_3$, and supplied under the trademark "Speculite" by C.E. Minerals, Inc. of King of Prussia, Pennsylvania. The first component may consist of "fine" particles of this ore in the range of about −16 + 140 U.S. mesh; that is, the particles will pass through a 16 mesh screen but not through a 140 mesh screen. A suitable alternate first component particle may comprise limestone particles in the range of about −20 + 40 U.S. mesh. In both cases the second component consists of "coarse" Speculite particles in the range of about −12 + 16 U.S. mesh. The bed system containing these fine and coarse particles is fluidized with gas at a superficial velocity of about 30 feet per second.

At this velocity, the fine hematite or limestone particles are carried along with the current of air, forming an entrained fluidized bed which is highly expanded to fill substantially the entire space region encompassed by the main combustor chamber and its exit conduit. The coarse hematite particles are too massive to be entrained, but form a dense fluidized bed which is retained in a more limited space region at the bottom of the main combustor chamber. The fine particles are carried out of the main combustor chamber and into a separator, such as a cyclone separator, whereby the fine particles are removed from the entraining gas stream and fed into a recirculation path. The recirculation path carries the fine particles back through the dense fluidized bed. Hence there is a continuous, recirculating flow of entrained fine particles through the agitated, fluidized mass of coarse particles.

Ground coal is fed into the dense fluidized bed containing the commingled coarse and fine particles and burned to produce heat. The heat is removed by passing a heat transfer medium, such as water contained in boiler tubes, through the region of the entrained fluidized bed as well as the region of the dense fluidized bed. Pulverized limestone having a typical particle size of −325 U.S. mesh is fed in with the coal. The temperature in the combustor is maintained at about 1550° F to promote the efficacy of the limestone as a sulfur sorbent.

The numerous advantages of a fluidized bed boiler operated in accordance with the present invention can be explained by an examination of its characteristics. The recirculating fine bed component particles which interpenetrate the dense fluidized bed appear to provide highly uniform fluidization and minimize "slugging". The agitated motion of the commingled particles results in thorough mixing and intimate contact between the gaseous and solid reactants introduced into the dense fluidized bed. Even though the superficial velocity is unprecedentedly high, the commingled bed particles substantially retard the movement of the coal and pulverized limestone particles in the principal direction of air flow. Hence the coal particles are retained in the dense fluidized bed for a sufficient length of time to allow the major portion of the coal particles to be completely burned before they are carried out of the dense bed region. Similarly the residence time of the pulverized limestone particles is made sufficient to insure its effectiveness as a sorbent.

It is apparent that the limestone surface area available to react with the sulfur dioxide, for a given weight of limestone, can be vastly increased by finer grinding, as is done in the case of agricultural limestone. However, it has not previously been possible to utilize the finely-ground limestone in high-velocity fluidized bed combustors because the small particles would simply be blown out of the combustor before they could absorb any substantial quantity of sulfur. Hence coarse limestone has been used according to most of the prior proposals, depending on attrition to keep new surfaces continuously exposed. However, limestone with satisfactory attrition characteristics is not readily available in all parts of the world. The present methods make it possible in all probability to use limestone from anywhere in the world, without concern for its attrition characteristics in a fluidized bed.

The increased residence time for the fine coal particles or the pulverized limestone particles in the dense fluidized bed portion of the illustrative combustor, operated in accordance with the methods of this invention at high superficial velocities, probably occurs because the coarse bed component particles limit the mean free path of the fine bed component particles, and both of these bed component particles limit the mean free path of the coal and limestone particles in the dense bed region.

The use of finely ground, pulverized limestone as a sulfur sorbent, in the manner made possible by the methods of the present invention, somewhat reduces the consumption of limestone and thereby reduces the quantity of the resulting sulfated limestone to be disposed of. The efficiency of limestone utilization is further improved by the grinding effect of the hematite, which continually provides fresh limestone surfaces for sulfur dioxide absorption.

The high throughput per unit volume, and high heat release rate of a fluidized bed boiler operated according to the methods of the present invention are achieved in part by the high heat transfer rate throughout the entire volume of the main combustion chamber, including what is normally the freeboard region above the dense fluidized bed. This freeboard region as well as the dense fluidized bed region may contain boiler tubes which receive a high input of heat transmitted by the fine bed component particles permeating the entire boiler tube space because of their entrainment in the gas stream.

A fluidized bed boiler operated according to this invention nevertheless can provide high turndown ratios, and is therefore controllable to suit widely varying load requirements. By reducing the coal feed rate and the concommitant air flow, the boiler can be turned down until it is operating at low heat output and as a conventional fluidized bed with no entrainment of the fine bed particles.

SUMMARY

According to this invention we provide a method of operating a fluidized bed system, which comprises forming an entrained fluidized bed in a first space region containing a first solid bed particle component, forming in a more limited space region within the first region a dense fluidized bed containing a second solid bed particle component essentially comprising a material having long-term physical and chemical stability in the fluidized bed system so that the components are substantially non-agglomerating and not subject to substantial attrition therein, providing a recirculation path for the first particle component from the first space region through the dense fluidized bed in the more limited space region, and operating the fluidized bed system at a velocity such that the second component particles are effectively retained in the dense fluidized bed in the more limited space region, whereas the first component particles recirculate and interpenetrate therethrough, commingling with the second component particles.

Typically the method is useful for promoting a high-efficiency reaction between at least two reactants, and comprises feeding the reactants into the fluidized bed system in such manner as to provide thorough mixing of the reactants as a result of the motion of the commingled particles in the dense fluidized bed. At least one of the reactants may be a gaseous material, in which case the method typically comprises fluidizing the bed system with the gaseous material. The other reactant may be a solid particulate material to be reacted with the gaseous material at a predetermined rate, and the method typically comprises feeding the solid reactant into the bed system at the predetermined rate, fluidizing the bed system at a superficial velocity such that the gaseous reactant is supplied thereto at a rate sufficient to effect a substantially complete reaction of at least one of the reactants being fed, and selecting the bed particle components so that the first component particles will be entrained at the superficial velocity while the second component particles will be effectively retained in the dense fluidized bed in the more limited space region.

The solid reactant may comprise particles which are entrainable at the superficial velocity, and the method typically comprises providing a quantity of the second bed component particles which sufficiently restricts the movement of the reactant particles to effect a residence time thereof in the dense bed wherein the major portion of at least one of the reactants is completely reacted in the more limited space region. One of the reactants may be a carbonaceous fuel, and the method typically comprises withdrawing an energy product from the fluidized bed system. The carbonaceous fuel may be burned in the fluidized bed system to produce an energy product which is heat.

The heat energy may be withdrawn by conveying a heat transfer medium through boiler tubes in the first space region.

The method may also comprise passing a heat transfer medium through at least a portion of the recirculation path, whereby heat contained in the first particle component is transferred to the medium.

Where the solid reactant essentially comprises coal particles and the gaseous reactant essentially comprises air, the method typically comprises burning the coal in the fluidized bed system, selecting the quantity of the second bed component particles so that the major portion of the coal is burned in the dense fluidized bed, and withdrawing heat energy from the fluidized bed system. This is typically done by passing a heat transfer medium through at least a portion of the first space region outside the limited space region, and selecting the quantity of the first bed component particles so that the rate of heat transfer to the medium is substantially maximized. Typically the heat transfer medium is also passed through the more limited space region.

Typically the method comprises withdrawing heat energy at a rate sufficient to maintain the temperature of the fluidized bed system essentially below the melting point of the ash formed from the coal particles whereby essentially all of the ash is entrained with the first solid bed component particles, and separating the ash from the first solid bed component particles in the recirculation path outside the more limited space region.

The carbonaceous fuel may contain sulfur, and the method typically includes feeding a sulfur sorbent into the fluidized bed system. The sulfur sorbent typically comprises a carbonate of calcium and/or magnesium, such as are contained in limestone or dolomite, with a particle size in the range of about $-100$ to $-325$ U.S. mesh. The dense fluidized bed is typically maintained at a temperature in the range of about 1400° to 1750° F. The ratio of the calcium in the carbonate fed into the system to the sulfur in the carbonaceous fuel fed into the system is typically 1 to 3 moles of calcium to one mole of sulfur.

Typically the first and second solid bed particle components may consist essentially of the same material, the first component essentially comprising finer particles and the second component essentially comprising coarser particles.

Typically at least the second bed particle component has high temperature stability, is substantially inert under the operating conditions of the fluidized bed system, and is selected to provide good fluidization quality and promote efficient mixing and heat transfer in the bed system. Where oxidizing conditions exist in the fluidized bed system, typically the bed particle components essentially comprise metals or metallic oxides such as an oxide of iron, typically, as it is contained in hematite. The components alternately may essentially comprise aluminum oxide or nickel or nickel oxide. The finer iron oxide particles may be in the size range of about $-16 + 140$ U.S. mesh, and the coaser particles may be in the size range of about $-12 + 16$ U.S. mesh. Typically the dense fluidized bed is retained in a container having a substantially cylindrical or prismatic portion, and the quantity of the coarser particles is sufficient to fill the cylindrical or prismatic portion to a depth of at least about 10 inches when the bed is unfluidized. The superficial velocity of the fluidized bed may be in the range of about 20–40 feet per second. In another typical arrangement, the first solid bed particle component essentially comprises a carbonate of calcium, magnesium, or both, as is contained in limestone or dolomite. In this case the second solid bed particle component may essentially comprise a metal or a metallic oxide such as an oxide of iron which is contained in hematite.

Alternatively, the second bed particle component essentially comprises aluminum oxide or nickel or nickel oxide.

The second bed component particles may comprise hematite, in the particle size range of about $-12 + 16$ U.S. mesh, the first component particles may comprise limestone in the particle size range of about $-20 + 40$ U.S. mesh and the superficial velocity of the fluidized bed system may be in the range of about 20–40 feet per second, while a heat transfer medium is conveyed through boiler tubes in the first space region including the more limited space region.

Typically, the flow of the first solid bed component particles in the recirculation path is restricted so as to form a reservoir of particles upstream of the flow restriction, thereby accumulating in the reservoir a quantity of particles sufficient to prevent backflow in the recirculation path which might otherwise result from the fluidizing pressure applied to the dense fluidized bed. For an ash-forming process wherein the particles accumulated in the reservoir are accompanied by residual ash, the method typically comprises fluidizing the particles in the reservoir to selectively entrain the ash, and removing the entrained ash for disposal.

The flow restriction, the quantity of particles, and the fluidizing velocity may be selected to provide an appropriate recirculation rate for the first solid bed component particles, which could be expressed in pounds per hour per square foot of cross section of the dense fluidized bed normal to the principal direction of movement of the first component particles therethrough, sufficient to substantially maximize the overall heat transfer rate in the first space region.

Where air is reacted with a carbonaceous fuel, our method typically comprises supplying a portion of the air to the dense fluidized bed with a velocity sufficient to fluidize the second component particles therein and to maintain the circulation of the first component particles therethrough while operating at least the major portion of the dense bed in an oxygen-deficient mode, and supplying another portion of the air to the entrained bed so that at least the major portion of the entrained bed is operated in an excess-oxygen mode. A heat transfer medium may be passed through at least a portion of the first space region outside the more limited space region so as to withdraw heat energy therefrom.

Illustrative methods in accordance with the present invention can now be described with reference to the accompanying drawings.

DRAWINGS

TYPICAL EMBODIMENTS

Figure 1:
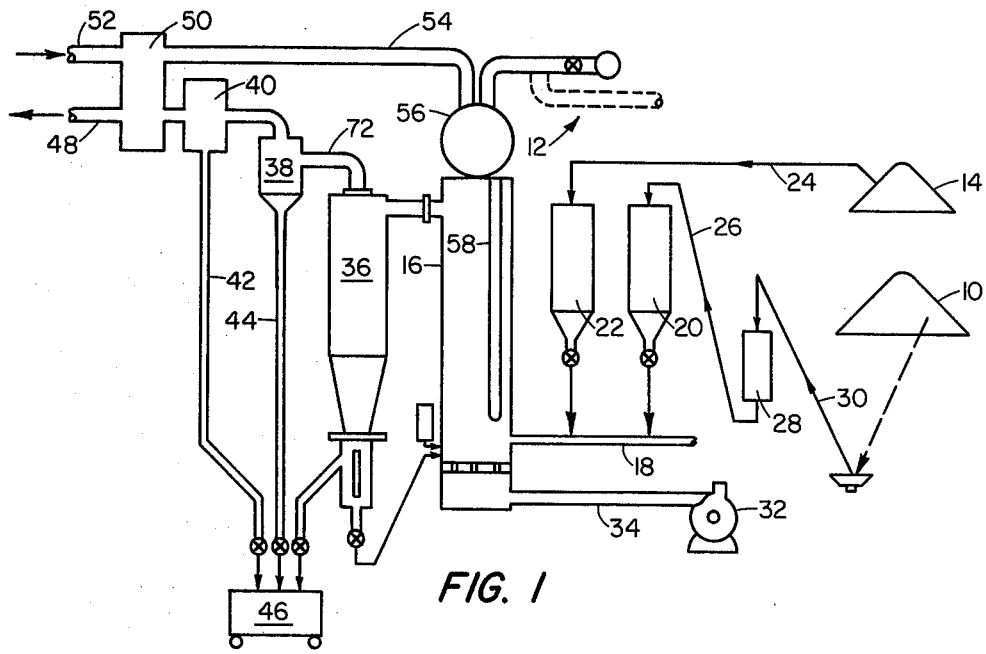
FIG. 1 is a schematic drawing of a typical fluidized bed boiler installation adapted for operation according to the present invention.

Referring to the drawings, a typical fluidized bed system operated according to the methods of the present invention is adapted to burn high-sulfur coal from a storage facility 10 and supply a heat energy product in the form of pressurized steam to a steam conduit system 12. A further raw material in the form of pulverized limestone (principally $CaCO_3$) or dolomite (principally $CaMg(CO_3)_2$ from storage facility 14 is used as a sorbent to retain the sulfur in the coal and limit the emission of sulfur dioxide through the stack gases to an acceptable level.

The coal is burned in a main combustor chamber 16, into which ground coal is injected through a line 18 wherein the coal is carried along with a stream of compressed air. The line 18 is also used to inject pulverized limestone. The ground coal and limestone are supplied from respective short term (four hours) supply hoppers 20 and 22 and metered into the injector line 18 by conventional star feeders or like feeders (not shown). The supplies of limestone and coal are replenished via conveyors 24 and 26. The limestone in the supply 14 may be commercially available pulverized agricultural limestone, whereas the coal in the supply 10 may need to be ground on site by a grinder 28 fed by an elevator conveyor 30.

Air for supporting the combustion of the coal, as well as for fluidizing the fluidized beds to be described, is supplied from a suitable blower 32 via a conduit 34 under a pressure of about four pounds per square inch or more. Solids entrained in the gas stream through the main combustion chamber 16 are removed by a primary separator 36, a secondary separator 38 and an electrostatic precipitator 40. The solids removed by the secondary separator 38, typically a cyclone, and the solids removed by precipitator 40, consist essentially of ash, which is led through drop tubes 42 and 44 to an ash dump 46. The operation of the primary separator 36 will be further described below.

Before the stack gases are vented to the chimney through flue conduit 48, they are passed through a heat exchanger 50 wherein a major portion of their remanent heat is transferred to the boiler feedwater entering via a pipe 52. The warmed feedwater is then conducted via a pipe 54 to a feedwater drum 56 to make up for any boiler water losses. The condensate returned from the steam conduit system 12 plus the added feedwater is fed through a conventional manifold (not shown) to a set of boiler tubes as at 58. For clarity of illustration, only the one tube 58 is shown. It is a U-shaped tube which receives water from the feed-water manifold at one end 58a. It descends into the main combustor chamber and returns, carrying steam through its other end 58b to a steam manifold and steam drum (not shown) connected to the steam supply conduit system 12.

Figure 2:
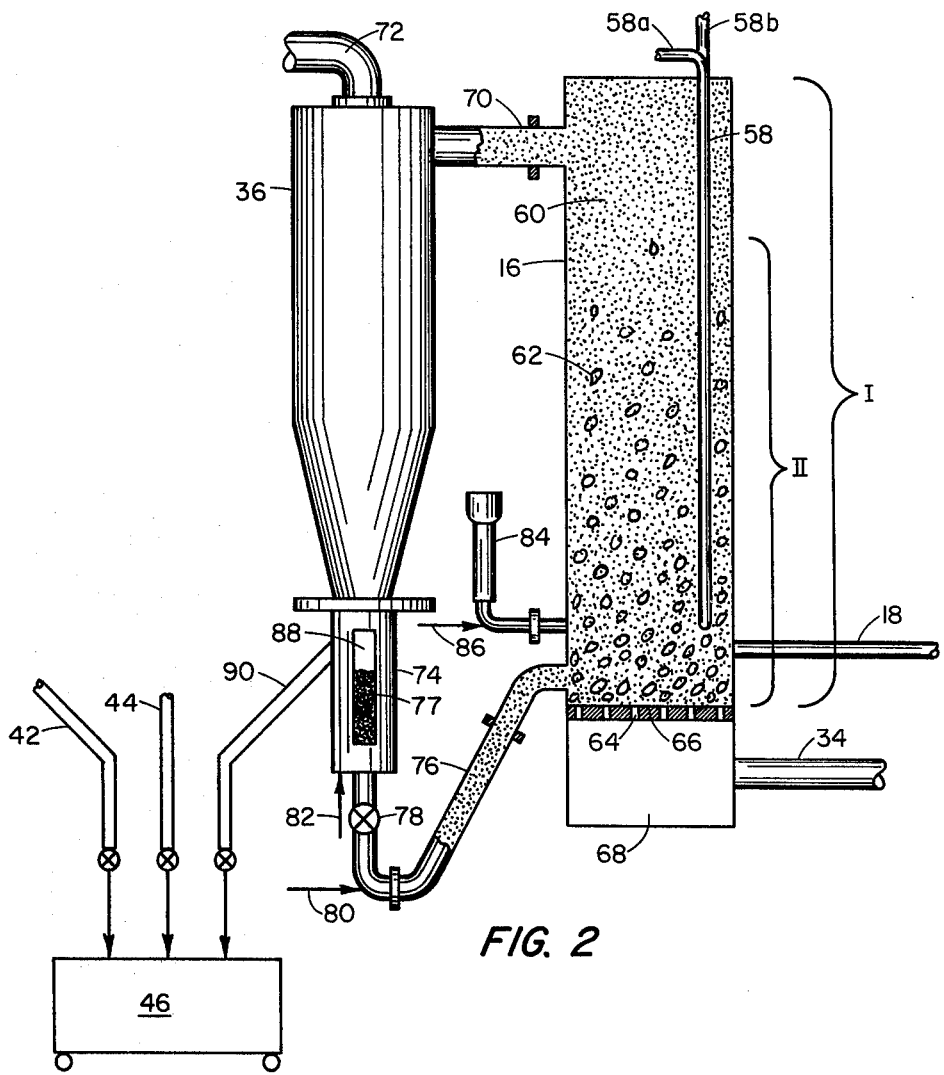
FIG. 2 is an enlarged and more detailed schematic drawing of the main combustor chamber, separator and recirculation system of FIG. 1.

As shown more particularly in FIG. 2, there is formed principally in the main combustor chamber 16 an entrained fluidized bed in a first space region I containing a first solid bed particle component 60. There is also formed in a more limited space region II within the first region I a dense fluidized bed containing a second solid bed particle component. The particles as at 62 of this second component essentially comprise a material having long-term physical and chemical stability in the fluidized bed system so as to be substantially non-agglomerating and not subject to substantial attrition therein.

The first particle component 60 is entrained in the flow of gas through the combustor 16. The flow of gas originates with the air injected upwardly through holes as at 64 in a distributor 66 above a plenum chamber 68 which receives air through conduit 34 from blower 32. The component particles 60 are carried out of the combustor 16 through a conduit 70 and into the primary separator 36. The separator 36 is herein illustrated as a cyclone which removes substantially all of the first component particles from the gas stream before the gas exits through a conduit 72.

The separator 36, together with a reservoir chamber 74 and a recycle conduit 76, provide a recirculation path for the first particle component 60 from the first space region I through the dense fluidized bed in the more limited space region II. The superficial velocity of the bed system is such that the second component particles as at 62 are retained in the dense fluidized bed, whereas the first component 60 particles recirculate and interpenetrate through the dense bed, commingling with the second component particles.

In the combustor system, the two primary reactants are the particulate coal fed through conduit 18 and the air fed through conduit 34. These reactants, as well as the pulverized limestone also fed in through conduit 18, are thoroughly mixed as a result of the motion of the commingled particles in the dense fluidized bed. The coal and limestone are injected at a point above distributor 66 but below the boiler tubes as at 58 so that a substantial degree of mixing occurs, without interference due to the presence of the boiler tubes, before the reactants are carried up into the region of the tubes.

Typically the main combustor chamber 16 may be 20 feet or so in height, with a square cross section, of a size sufficient to accommodate the number of boiler tubes required to carry off the maximum required output of heat at about the optimum temperature of the dense fluidized bed in the range of about 1450° to 1750° F. Typically the boiler tubes as at 58 may be two inches in diameter and spaced as closely as two inches apart. It may be possible to arrange the tubes so that there are more tubes per unit of cross-sectional area at the top of the combustor, in region I but outside of region II, than there are at the bottom, in the region of the dense fluidized bed, since the entrained fluidized bed may more readily flow through the smaller spaces between the tubes. Because of the low temperature and the high cooling efficiency of the fluidized beds, the combustor 16 may comprise a simple steel-jacketed enclosure, insulated on the outside with refractory felt or refractory brick if desired.

The predetermined maximum rate of coal feed is that sufficient to produce the maximum required heat output. The input rate of air flow through conduit 34 and distributor 66 must then be that sufficient to effect a substantially complete combustion reaction of the coal. It has been found that about a 20% excess of oxygen, over and above the amount needed to oxidize the carbon to $CO_2$, is required in order to obtain satisfactorily high combustion efficiency, and this is taken into account in determining the input air flow rate requirement.

The maximum input air flow rate in turn determines the required maximum superficial velocity of the fluidized bed system. Based on the maximum superficial velocity, the bed particle components are selected so that the first component particles 60 will be entrained, whereas the second component particles will be retained in the dense fluidized bed in the more limited space region II. Assuming that a suitable material has been selected, such as the Speculite mineral (hematite) above described, the required particle sizes can be determined to a close approximation by analytical and graphical calculations of the form described in an article by L. Reh, "Fluidized Bed Processing," *Chemical Engineering Progress*, Vol. 67, No. 2, February 1971, pp. 58–63. Reference can also be made to U.S. Pat. No. 3,565,408.

For a particular fluidized bed apparatus, the values obtained by calculation can be refined if necessary by a few experiments. The second component particles 62 are typically of a slightly larger size than the largest particle which will be blown over into separator 36 as a regular occurrence, and with a narrow range of particle sizes. The first component particles typically have a wider range of sizes and a distribution extending from the largest particle which will be regularly blown over into separator 36, through progressively smaller sizes to a size slightly larger than the largest particle which will be blown over into secondary separator 38 as a regular occurrence.

To illustrate, a working model has been constructed, wherein the combustor 16 was formed from a six-inch diameter, circular steel tube about ten feet high, but which was otherwise quite similar to the apparatus shown in FIG. 2. Operating at a superficial velocity of around thirty feet per second, the bed particle components both consisted of Speculite mineral. The second component particles 62 had a size distribution shown by the following sieve analysis:

| U.S. Mesh | Wt. % |
| --- | --- |
| 31 8 +10 | 0.0 |
| −10 +12 | 4.99 |
| −12 +16 | 92.40 |
| −16 +20 | 2.25 |
| −20 +30 | 0.15 |
| −30 | 0.21 |

The sieve analysis for the first component 60 particles was:

| U.S. Mesh | Wt. % |
| --- | --- |
| −12 +16 | 2.5 |
| −16 +20 | 10.1 |
| −20 +30 | 14.2 |
| −30 +40 | 17.8 |
| −40 +70 | 35.4 |
| −70 +100 | 9.7 |
| −100 +140 | 7.4 |
| −140 +200 | 0.66 |
| −200 +324 | 0.62 |
| −325 | 0.71 |

The quantity of the second component particles 62 provided is typically sufficient to restrict the movement of the coal particles in the principal direction of air flow so as to effect a residence time of the coal particles in the dense bed such that the major portion of the coal is completely burned in region II. Pressure measurements at points along the height of combustor 16 indicate that almost the entire pressure drop of the fluidizing gas above distributor 66 takes place across the dense bed in region II. It is therefore concluded that the residence time of an entrainable particle in the entrained fluidized bed is probably rather insignificant by comparison with its major residence time in the dense fluidized bed. As further evidence, it has been found that if the quantity of the second component particles is too greatly reduced, burning of incompletely reacted coal particles takes place to a substantial extent in the primary separator 36. This is undesirable in the case of the fluidized bed combustor system illustrated, although in some other applications it may be permissible or even desirable to allow a reactant to circulate several times through the system in order to carry the desired reaction to completion.

In a system operating at a superficial velocity of 20–40 feet per second, using the "coarse" and "fine" particles of Speculite mineral as in the above sieve analysis, a quantity of coarse particles 62 sufficient to fill the cylindrical or prismatic portion of the combustor 16 to a depth of at least about 10 inches (in the quiescent, unfluidized condition), is required to prevent the the undesired burning of a significant portion of the coal in the primary separator 36. On the other hand, a much greater quantity of the second component particles 62 is to be avoided. The more particles 62 there are in the dense fluidized bed, the greater the pressure drop which must exist across region II in order to maintain good fluidization and avoid slugging, and consequently the greater the pressure of the air which must be supplied by blower 32, resulting in greater power consumption and wear on the blower.

The primary functions of the first particle component 60 in the illustrated combustor system are to provide high heat transfer to the boiler tubes in the freeboard region within region I above region II, to increase the quality of fluidization in the dense bed in region II, to aid in the mixing of the coal, air and pulverized limestone and to help retain the reactants in the combustor 16 until the coal is substantially completely burned and most of the sulfur dioxide has been absorbed by the limestone. In the illustrated system, a further important function of the first particle component 60 is to seal the recirculation leg and thereby avoid the need for a rotary feeder or the like between the reservoir 74 and the conduit 76.

The air pressure applied to the bottom of the dense fluidized bed in region II is also applied as a back pressure to the conduit 76. In order to keep the fine bed component particles moving from the reservoir 74 through the conduit 76 and into the main combustor chamber 16 against this back pressure, the particles are fluidized by air injected into the conduit 76 through a tap indicated by an arrow 80. In order to provide the injected air with sufficient driving pressure within the conduit 76 to keep the particles moving into the combustor 16, a column of particles 77 is accumulated and maintained in the reservoir 74, at a depth sufficient to prevent the driving pressure in conduit 76 from escaping into cyclone 36. The reservoir of particles is maintained by restricting the flow of the particles from the reservoir 74 into the conduit 76 by means of a ball valve 78. The position of the valve controls the recirculation rate of the first component particles 60 through the combustor system.

Typically, in starting up the combustor only the coarse second component bed particles 62 are initially loaded into chamber 16, together with relatively coarse coal, e.g., −8 + 20 U.S. mesh, which is used until combustion has been initiated and the temperature in the combustor 16 has risen to above 1400° F. Thereafter, fine coal, or a run-of-the-mine mixture of sizes small enough to be fed through conduit 18 can be used. While only coal particles of −8 mesh, (including all smaller sizes) have been burned in the experimental model combustor due to its small size, it is believed that larger combustors can utilize coal having particles sizes as large as ⅛ inch or even ¼ inch in diametric measurements.

Start-up of the combustor takes place with ball valve 78 closed and without any fine first component 60 particles in combustor chamber 16, although a supply may be present in reservoir 74 so that drop leg 74, 76 will be sealed when the valve 78 is opened. Either initially or at any time, additional fine or coarse bed component particles can be fed into the combustor 16 through a hopper 84. An air injector tap indicated by the arrow 86 is provided to assist the flow of particles from the hopper into the combustor.

Valve 78 can be gradually opened, once the combustor is operating, until the desired recirculation rate is achieved. It is necessary to keep in mind the fact that a minimum height of fine particles in reservoir 74 is needed to seal the drop leg, and that under steady-state conditions the fine particles are returned to reservoir 74 at the same rate that they are allowed to pass through valve 78. Hence for a constant level of particles in reservoir 74 the recirculation rate is directly proportional to the inventory of fine first component 60 particles in transit through the entrained fluidized bed. When operating with a superficial velocity of 30 feet per second and using the fine Speculite mineral particles for the first bed component 60, it was found that the minimum depth of particles in reservoir 74 was about 18 inches in order for the drop leg to be kept sealed. In addition to this quantity of fine particles required to seal the drop leg, a minimum recirculating amount equivalent to a settled, unfluidized depth in combustor chamber 16 of about 1 ½ inches was found to be needed to produce a noticeably satisfactory improvement in heat transfer characteristics. With the addition of more and more fine particles, the heat transfer coefficient, given for example in British thermal units per square foot of boiler tube area per hour per degree Fahrenheit (Btu/ft-$^2$ hr- F), can be expected to increase until it eventually levels off. Enough of the fine particles are typically added to maximize the overall heat transfer to the boiler tubes, without causing undesired combustion instability, combustion inefficiency, stack gas composition, or the inability to achieve the required turndown ratio. Very satisfactory operation has been achieved with an amount of recirculating fine particles sufficient to fill the combustor chamber 16 to a settled depth of about 2 ½ to 3 inches under quiescent, unfluidized conditions. In order to assist in checking the fine particle inventory and the recirculation, a "sight glass" 88 arrangement as shown may be provided for reservoir 74.

The separator 36 is typically designed to trap substantially all of the first bed component particles 60 and return them to reservoir 74, while allowing as much ash as possible to pass out through overflow conduit 72 to separator 38. Much of the ash which unavoidably falls into reservoir 74 and is mixed with the fine bed particles 60 in column 77 is separated from the bed particles therein by providing an ash drop conduit 90 opening into the top of reservoir 74 and fluidizing the column 77 with compressed air injected through one or more air injector taps represented by arrow 82.

The first component particles 60 and the second component particles 62 have both been very satisfactorily constituted essentially of iron oxide as contained in the Speculite mineral. This mineral as received has many sharp edges on the particles, and consequently was found to be subject to an initial attrition loss of about 8.2 percent during the first five hours of operation. Thereafter it leveled off, however, to an insubstantial, constant attrition rate of about 0.25 percent per day, once the sharp edges had been ground off. The one-time, 8-percent loss is justified because of the relatively low cost of this material, and the 0.25 percent per day replacement cost represents a relatively minor operating expense which can be justified by the savings made possible in other areas noted above and the improved performance which may be achieved.

Satisfactory operation of the working model combustor has also been achieved using ground limestone in the particle size range of about −20 + 40 U.S. mesh as the first bed particle component 60. The coarse Speculite mineral (−12 + 16 mesh) was used as described above to make up the second particle component 62. The fluidized bed system was operated as before at a superficial velocity of about 30 feet per second. It is to be noted that the pulverized limestone (−325 mesh) was still used as the primary sulfur sorbent since the available surface area and attrition rate for the −20 + 40 mesh limestone would not permit it to absorb more than a fraction of the sulfur dioxide produced by the burning of the coal.

As noted above, the type of limestone (or dolomite) available may depend on its geographic origin, and it may be subject to any one of a variety of different attrition rates. If limestone with a high attrition rate is used as the first bed particle component 60, a suitable arrangement must be made for periodically or continuously replacing the lost limestone of component 60. At the same time, the rate at which the pulverized limestone is fed from supply 22 can possibly be reduced. In another case, the limestone used to form component 60 may not be subject to substantial attrition, and will need to be replenished only at occasional intervals, whereas substantially all of the limestone required to absorb the sulfur in the coal must be supplied from the pulverized limestone supply 22. Experiments using different grinds of pulverized limestone as fine as −325 mesh have shown that in a "once through" system, similar to that illustrated in FIG. 2, the finer the limestone the more effective it is in removing the sulfur, and consequently the smaller the quantity of limestone which must be used to desulfurize the gases from the combustor to an acceptable level. Limestone particles in the size range of about −100 to −325 U.S. mesh have been found to be effectively usable in the working model, once-through system similar to FIG. 2. The size of the pulverized limestone or dolomite particles to be used for a particular application may be determined in accordance with the most economical compromise, depending on limestone type, the amount of sulfur in the coal, limestone cost, grinding and screening costs, and disposal and/or processing considerations and the allowable level of sulfur in the stack gases.

The second solid bed particle component 62 essentially comprises a material having long-term physical and chemical stability in the fluidized bed system so as to be substantially non-agglomerating and not subject to substantial attrition therein. In the general case, this material may catalyze or even enter temporarily into a chemical reaction occurring in the fluidized bed system, but over a period of time measured in weeks or months it is not substantially "used up" in the chemical sense, nor does it change its physical characteristics substantially, either by agglomeration or attrition, to such an extent that its behavior in the fluidized bed system is substantially altered.

For the case of the fluidized bed combustor, it has been found that in addition to an iron oxide as exemplified in the foregoing description, other suitable materials are aluminum oxide, nickel, and nickel oxide. In addition to their characteristics of long-term chemical and physical stability under the operating conditions within the combustor, each of these materials rates high in terms of its "heat transfer parameter" (HTP) which is given by $$\text{HTP} = C_{ps}^{0.8} \rho_s^{1.43}$$

where $C_{ps}$ is the specific heat of the solid and $\rho_s$ is the solid density. The HTP is related to the heat transfer behavior of the bed particle component in the fluidized bed system. The HTP values for four materials which have been found suitable for use in the combustor are $Fe_2O_3$ 3.81; $Al_2O_3$ 2.77; $Ni$ 4.65; and $NiO$ 4.09. The $Fe_2O_3$ has a great economic advantage in that it occurs in very high concentrations in natural hematite ore which is available at relatively low cost. There may be many other materials including other metals, their alloys and oxides, cermets, intermetallics, or coated particles which may be found suitable for use in combustors or other fluidized bed applications.

Figure 3:
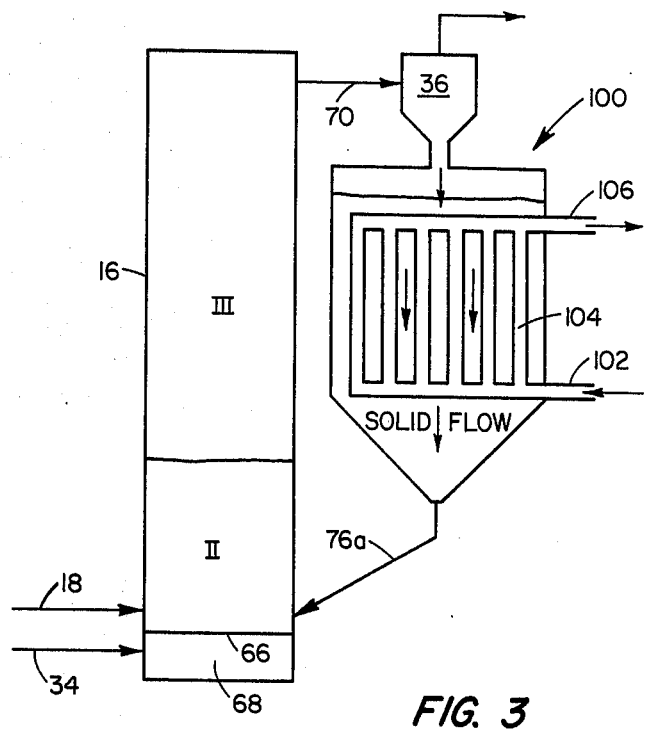
FIG. 3 is a schematic drawing showing a modification of the apparatus of FIG. 2 wherein a heat exchanger zone is included in the recirculation path for the entrainable fluidized bed component particles.

In the combustor system of FIG. 3, a heat transfer medium is passed through at least a portion 100 of the recirculation path so that heat contained in the first particle component is transferred to the medium. The reference numerals of FIG. 2 are used to denote similar parts in FIG. 3. The Roman numeral III designates the portion of region I outside of region II within the combustor chamber 16.

As illustrated in FIG. 3, the entrained solids from region III pass through the conduit 70 into the primary separator 36. The first solid bed component particles 60, of fine Speculite mineral for example, are delivered from the underflow of the separator 36 to a moving bed heat exchanger 100. The heat exchanger 100 forms a part of the recirculation path for the first particle component 60 through conduit 76a and region II. In the heat exchanger 100, a heat transfer medium (coolant) such as water is passed through a feedwater pipe 102, thence through heat transfer tubes as at 104, and out through a hot coolant or steam pipe 106. The recirculating bed particles flow downwardly around tubes 104 so that the heat contained in the bed particles is transferred through the tubes 104 to the coolant.

The heat exchange arrangement of FIG. 3 may be used to reduce the amount of heat transfer surface required in the combustor 16, or even to eliminate the need for boiler tubes in the combustor. In place of the moving bed and tube heat exchanger 100, a dense fluidized bed or other heat exchanger can be used.

Figure 4:
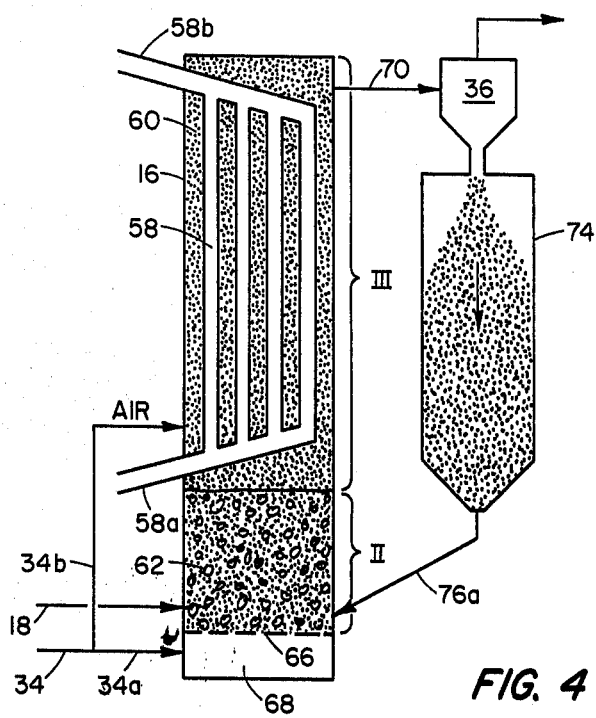
FIG. 4 is a schematic drawing showing how the fluidized bed system of FIG. 2 can be adapted for two-stage combustion.

FIG. 4 shows a system for carrying out two-stage combustion according to the invention. Here an initial stage, operated in an oxygen-deficient mode, is followed by a second stage operating in an excess-oxygen mode. This approach is desirable primarily to reduce $NO_x$ emissions.

While two-stage combustion as such has been suggested by others in the past, the prior proposals have not adequately solved the problems which arise as a result of CaS formation in the oxygen-deficient zone. CaS is not suitable for landfill disposal. An additional difficulty with prior two-stage combustor proposals is the result of the short retention time and inadequate mixing obtained in the second stage.

In the arrangement of FIG. 4, the dense bed region is operated under oxygen-deficient conditions and additional air is injected above the dense bed surface to oxidize the reducing gases present together with the CaS entrained with the entrained bed material.

The high degree of turbulence in the entrained bed region provides the mechanism for enhancing the physical and chemical reactions of interest in this process. Heat transfer surfaces can be provided to remove heat generated on combustion in the entrained zone so that $SO_2$ removal efficiency remains high. The $NO_x$ reduction reaction

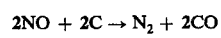

can be optimized without severely compromising heat transfer surface needs. The use of fine limestone particles enhances the solid-gas reactions required for successful operation.

Referring specifically to FIG. 4, again the reference numerals of FIG. 2 are used to designate similar parts. A notable difference between FIG. 2 and FIG. 4 is in that the fluidizing air supply conduit 34 is split into two portions 34a and 34b. The portion of the air fed in through conduit 34a is supplied to the dense bed in region II with a velocity sufficient to fluidize the second component particles 62 therein, and to maintain the circulation of the first component particles 60 therethrough while operating at least the major portion of the dense bed in an oxygen-deficient mode. The other portion of the fluidizing air fed in through conduit portion 34b is supplied to the entrained fluidized bed in region III, so that at least the major portion of the entrained bed is operated in an excess-oxygen mode.

A heat transfer medium, such as boiler feedwater, is passed via water and steam pipes 58a and 58b through boiler tubes as at 58 passing through at least a portion (region III) of the first space region I (FIG. 2) so as to withdraw heat energy therefrom.

Since the carbonaceous fuel comprises high sulfur coal in this case, a sulfur sorbent, e.g. limestone, is also fed in with the coal through conduit 18 into the fluidized bed system, specifically into the dense fluidized bed above distributor 66. The use of pulverized limestone, e.g., −325 U.S. mesh, together with low temperature operation as hereinabove described, ensures that the CaS formed in the dense bed will be in the form of fine particles which will be carried up into the fully entrained bed region III. Here they are oxidized to $CaSO_4$ as a result of the excess oxygen and their substantial retention time in region III resulting from the presence, in the entrained fluidized bed, of the first solid bed particle component 60. At the same time, the passage of the heat transfer medium through this region maintains the entrained material at a sufficiently low temperature to prevent decomposition of the sulfate which could otherwise result in the regeneration of $SO_2$.

As noted hereinabove, a ten-foot-high, six-inch-diameter combustor system similar to that shown in FIG. 2 has been constructed and operated to burn Illinois #6 coal containing about 3.9 percent sulfur with the typical results given below. The second solid bed particle component 62 used was the "coarse" Speculite mineral (−12 + 16 U.S. mesh) with the sieve analysis given above. The first solid bed particle component 60 used in one group of experiments was the "fine" Speculite mineral (−16 + 140 U.S. mesh) with the sieve analysis above.

| | |
|---|---|
| Unfluidized Depth of Coarse Speculite | 15 inches |
| Coal Feed Rate | 55 (lb./hr) |
| Coal Size | <8 U.S. mesh |
| Pulverized Limestone Feed Rate | 12 (lb/hr) |
| Pulverized Limestone Mesh Size | −325 U.S. mesh |
| Dense Bed Temperature | 1650 F |
| Entrained Bed Temperature | 1360 F |
| Calcium/Sulfur Mole Ratio | 1.5 |
| Sulfur Retention | 85 % |
| Dense Bed Heat Tansfer Coefficient (BTU/hr-ft$^2$ - ° F) | 64 |
| Entrained Bed Heat Transfer Coefficient (BTU/hr-ft$^2$ - ° F) | 33 |
| Combustion Efficiency | >90 % |

While the practice of our invention has been described and illustrated using specific procedures and specific apparatus, such description and illustration is meant to be exemplary only and not restrictive, since obviously many changes and modifications can be made without departing from the spirit and scope of the invention.

We claim:

1. A method of operating a fluidized bed system, which comprises
    forming an entrained fluidized bed in a first space region containing a first relatively fine solid bed particle component,
    forming in a more limited space region within the first region a dense fluidized bed containing a second relatively coarse solid bed particle component essentially comprising a material having long-term physical and chemical stability in the fluidized bed system so as to be substantially non-agglomerating and not subject to substantial attrition therein,
    providing a recirculation path for the first particle component from the first space region through the dense fluidized bed in the more limited space region, and
    operating the fluidized bed system at a velocity such that the second component particles are effectively retained in a fluidized state in the dense fluidized bed in the more limited space region, whereas the first component particles recirculate and interpenetrate therethrough, co-mingling with the second component particles.

2. A method as in claim 1 for promoting a high-efficiency reaction between at least two reactants, comprising
    feeding the reactants into the fluidized bed system in such manner as to provide thorough mixing of the reactants as a result of the motion of the commingled particles in the dense fluidized bed.

3. A method as in claim 2 wherein at least one of the reactants is a gaseous material, comprising
    fluidizing the bed system with the gaseous material.

4. A method as in claim 3 wherein the other reactant is a solid particulate material to be reacted with the gaseous material at a predetermined rate, comprising
    feeding the solid reactant into the bed system at the predetermined rate,
    fluidizing the bed system at a superficial velocity such that the gaseous reactant is supplied thereto at a rate sufficient to effect a substantially complete reaction of at least one of the reactants being fed, and
    selecting the bed particle components so that the first component particles will be entrained at the superficial velocity while the second component particles will be effectively retained in the dense fluidized bed in the more limited space region.

5. A method as in claim 4 wherein the solid reactant comprises particles which are entrainable at the superficial velocity, comprising
    providing a quantity of the second bed component particles which sufficiently restricts the movement of the reactant particles to effect a residence time thereof in the dense bed wherein the major portion of at least one of the reactants is completely reacted in the more limited space region.

6. A method as in claim 4 wherein one of the reactants is a carbonaceous fuel, comprising withdrawing an energy product from the fluidized bed system.

7. A method as in claim 6, wherein the carbonaceous fuel is burned in the fluidized bed system and the energy product is heat.

8. A method as in claim 5 wherein one of the reactants is a carbonaceous fuel, comprising withdrawing an energy product from the fluidized bed system.

9. A method as in claim 8, wherein the carbonaceous fuel is burned in the fluidized bed system and the energy product is heat.

10. A method as in claim 9, comprising conveying a heat transfer medium through boiler tubes in the first space region.

11. A method as in claim 9, comprising passing a heat transfer medium through at least a portion of the recirculation path whereby heat contained in the first particle component is transferred to the medium.

12. A method as in claim 10, comprising passing a heat transfer medium through at least a portion of the recirculation path whereby heat contained in the first particle component is transferred to the medium.

13. A method as in claim 5 wherein the solid reactant essentially comprises coal particles and the gaseous reactant essentially comprises air, the method comprising
burning the coal in the fluidized bed system,
selecting the quantity of the second bed component particles so that the major portion of the coal is burned in the dense fluidized bed, and
withdrawing heat energy from the fluidized bed system.

14. A method as in claim 13 which comprises
passing a heat transfer medium through at least a portion of the first space region outside the limited space region, and
selecting the quantity of the first bed component particles so that the rate of heat transfer to the medium is substantially maximized.

15. A method as in claim 14, wherein the heat transfer medium is also passed through the more limited space region.

16. A method as in claim 13, comprising
withdrawing heat energy at a rate sufficient to maintain the temperature of the fluidized bed system essentially below the melting point of the ash formed from the coal particles whereby essentially all of the ash is entrained with the first solid bed component particles, and
separating the ash from the first solid bed component particles in the recirculation path outside the more limited space region.

17. A method as in claim 6 wherein the carbonaceous fuel contains sulfur, comprising feeding a sulfur sorbent into the fluidized bed system.

18. A method as in claim 17 wherein the sulfur sorbent essentially comprises a carbonate of calcium, magnesium, or both.

19. A method as in claim 18 which comprises maintaining the dense fluidized bed at a temperature in the range of about 1450° to 1750° F.

20. A method as in claim 18 wherein the sorbent is limestone or dolomite.

21. A method as in claim 18 wherein the sorbent essentially comprises solid particles in the range of about −100 to −325 U.S. mesh.

22. A method as in claim 21 wherein the ratio of the calcium in the carbonate fed into the system to the sulfur in the carbonaceous fuel fed into the system is about 1 to 3 moles of calcium to one mole of sulfur.

23. A method as in claim 1 wherein the first and second solid bed particle components consist essentially of the same material, the first component essentially comprising finer particles and the second component essentially comprising coarser particles.

24. A method as in claim 1 wherein at least the second bed particle component has high temperature stability, is substantially inert under the operating conditions of the fluidized bed system, and is selected to provide good fluidization quality and promote efficient mixing and heat transfer in the bed system.

25. A method as in claim 24 wherein oxidizing conditions exist in the fluidized bed system and wherein the bed particle components essentially comprise metals or metallic oxides.

26. A method as in claim 23 wherein the material essentially comprises an oxide of iron.

27. A method as in claim 26 wherein the material essentailly comprises hematite.

28. A method as in claim 25 wherein the components essentially comprise aluminum oxide or nickel or nickel oxide.

29. A method as in claim 26 wherein the finer particles are in the size range of about −16 + 140 U.S. mesh, the coarser particles are in the size range of about −12 + 16 U.S. mesh and the superficial velocity of the fluidized bed system is in the range of about 20–40 feet per second.

30. A method as in claim 29 wherein the dense fluidized bed is retained in a container having a substantially cylindrical or prismatic portion, and wherein the quantity of the coarser particles is sufficient to fill the cylindrical or prismatic portion to a depth of at least about 10 inches when the bed is unfluidized.

31. A method as in claim 1 wherein the first solid bed particle component essentially comprises a carbonate of calcium, magnesium, or both.

32. A method as in claim 31 wherein the first solid bed particle component is limestone or dolomite.

33. A method as in claim 32 wherein the second solid bed particle component essentially comprises a metal or a metallic oxide.

34. A method as in claim 33 wherein the second solid bed particle component essentially comprises an oxide of iron.

35. A method as in claim 34 wherein the second bed particle component essentially comprises hematite.

36. A method as in claim 33 wherein the second bed particle component essentially comprises aluminum oxide or nickel or nickel oxide.

37. A method as in claim 35 wherein the second bed component particles are in the size range of about −12 + 16 U.S. mesh, the first component particles are in the range of about −20 + 40 U.S. mesh and the superficial velocity of the fluidized bed system is in the range of about 20–40 feet per second.

38. A method as in claim 33 which comprises conveying a heat transfer medium through boiler tubes in the first space region including the more limited space region.

39. A method as in claim 1 which comprises restricting the flow of the first solid bed component particles in the recirculation path to form a reservoir of particles upstream of the flow restriction and
accumulating in the reservoir a quantity of particles sufficient to prevent backflow in the recirculation path which might otherwise result from the fluidizing pressure applied to the dense fluidized bed.

40. A method as in claim 39 for an ash-forming process wherein the particles accumulated in the reservoir are accompanied by residual ash, comprising fluidizing the particles in the reservoir to selectively entrain the ash, and removing the entrained ash for disposal.

41. A method as in claim 39 wherein the flow restriction, the quantity of particles, and the fluidizing velocity are selected to provide a recirculation rate for the first solid bed component particles sufficient to substantially maximize the overall heat transfer rate in the first space region.

42. A method as in claim 3 wherein the gaseous material is air and the other reactant is a carbonaceous fuel, comprising supplying a portion of the air to the dense bed with a velocity sufficient to fluidize the second component particles therein and to maintain the circulation of the first component particles therethrough while operating at least the major portion of the dense bed in an oxygen-deficient mode, and supplying another portion of the air to the entrained bed so that at least the major portion of the entrained bed is operated in an excess oxygen mode.

43. A method as in claim 42 comprising passing a heat transfer medium through at least a portion of the first space region outside the more limited space region so as to withdraw heat energy therefrom.

44. A method as in claim 43 wherein the carbonaceous fuel contains sulfur, comprising feeding a sulfur sorbent into the fluidized bed system.

45. A method as in claim 44 wherein the sulfur sorbent essentially comprises a carbonate of calcium, magnesium or both.

46. A method as in claim 1 wherein the first solid bed particle component essentially comprises a material having a long-term physical and chemical stability in the fluidized bed system so as to be substantially non-agglomerating and not subject to substantial attrition therein.

47. A method as in claim 1 wherein the first solid bed particle component consists essentially of a material that has high temperature stability, is substantially inert under the operating conditions of the fluidized bed system, and is selected to provide efficient heat transfer in the bed system.

48. A method as in claim 47 wherein oxiding conditions exist in the fluidized bed system and where the first bed particle component essentially comprises a metal or a metallic oxide.

49. A method as in claim 47 wherein the first bed particle component essentially comprises an oxide of iron.

50. A method as in claim 47 wherein the first bed particle component essentially comprises hematite.

51. A method as in claim 47 wherein the first bed particle component essentially comprises aluminum oxide or nickel or nickel oxide.

* * * * *